US012506215B2

(12) United States Patent
Chang et al.

(10) Patent No.: US 12,506,215 B2
(45) Date of Patent: Dec. 23, 2025

(54) ENCLOSURE COVER ATTACHMENT CONFIGURATIONS FOR TRACTION BATTERY PACKS WITH CELL-TO-PACK BATTERY SYSTEMS

(71) Applicant: FORD GLOBAL TECHNOLOGIES, LLC, Dearborn, MI (US)

(72) Inventors: Che-Chun Chang, Ann Arbor, MI (US); Patrick Daniel Maguire, Ann Arbor, MI (US); Mohammadreza Eftekhari, Novi, MI (US); Jason C. Marcath, Dearborn, MI (US); Karen Siler, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 726 days.

(21) Appl. No.: 17/893,498

(22) Filed: Aug. 23, 2022

(65) Prior Publication Data

US 2023/0307770 A1    Sep. 28, 2023

Related U.S. Application Data

(60) Provisional application No. 63/322,766, filed on Mar. 23, 2022.

(51) Int. Cl.
*H01M 50/264*  (2021.01)
*B60K 1/04*    (2019.01)
(Continued)

(52) U.S. Cl.
CPC ............. *H01M 50/271* (2021.01); *B60K 1/04* (2013.01); *B60L 50/64* (2019.02);
(Continued)

(58) Field of Classification Search
CPC ............. H01M 50/207; H01M 50/209; H01M 50/242; H01M 50/249; H01M 50/264; H01M 50/271
See application file for complete search history.

(56) References Cited

U.S. PATENT DOCUMENTS

| | | |
|---|---|---|
| 8,089,248 B2 | 1/2012 | Tabatowski-Bush |
| 8,968,912 B2 | 3/2015 | Maguire et al. |

(Continued)

FOREIGN PATENT DOCUMENTS

| | | |
|---|---|---|
| CN | 101860053 A | 10/2010 |
| CN | 101860053 B | 4/2015 |

(Continued)

*Primary Examiner* — Kevin E Yoon
(74) *Attorney, Agent, or Firm* — David B. Kelley; Carlson, Gaskey & Olds, P.C.

(57) ABSTRACT

Cover attachments are disclosed for securing an enclosure cover to a cell row/battery cell separator on traction battery packs that include cell-to-pack battery systems. One or more separators of a cell-to-pack battery system may be configured to separate cell stack rows or battery cells within the cell-to-pack battery system. A cover attachment (e.g., a clip, an adhesive puck, a magnet assembly, a hook and loop assembly, a ball-and-socket assembly, etc.) may connect to a portion of the separator for securing the enclosure cover directly to the cell-to-pack battery system. The combination of the cover attachments and the separators provides for enclosure cover retention at interior regions of the cell-to-pack battery system, maintains the enclosure cover at a spaced distance apart from the battery cells of the cell-to-pack battery system, and creates a desired amount of pack-level stiffness for distributing loads through the cell-to-pack battery system.

19 Claims, 6 Drawing Sheets

(51) Int. Cl.
  *B60L 50/64* (2019.01)
  *H01M 50/204* (2021.01)
  *H01M 50/271* (2021.01)
(52) U.S. Cl.
  CPC ....... *H01M 50/204* (2021.01); *H01M 50/264* (2021.01); *H01M 2220/20* (2013.01)

(56) References Cited

U.S. PATENT DOCUMENTS

| | | |
|---|---|---|
| 9,217,781 B2 | 12/2015 | Tabatowski-Bush et al. |
| 9,425,628 B2 | 8/2016 | Pham et al. |
| 9,446,680 B2 | 9/2016 | Chen et al. |
| 9,515,357 B2 | 12/2016 | Haskins et al. |
| 9,722,223 B1 | 8/2017 | Maguire |
| 9,799,932 B2 | 10/2017 | Haskins et al. |
| 10,109,897 B2 | 10/2018 | Haskins et al. |
| 10,529,966 B2 | 1/2020 | Shoji et al. |
| 10,566,647 B2 | 2/2020 | Andryukov et al. |
| 10,601,006 B2 | 3/2020 | Maguire et al. |
| 10,608,222 B2 | 3/2020 | Montgomery et al. |
| 10,759,281 B2 | 9/2020 | Miller et al. |
| 10,784,495 B2 | 9/2020 | Fernandez-Galindo et al. |
| 11,005,131 B2 | 5/2021 | Zhou et al. |
| 11,024,913 B2 | 6/2021 | Subramanian et al. |
| 11,050,125 B1 | 6/2021 | Zhu et al. |
| 11,114,726 B2 | 9/2021 | Gu et al. |
| 11,128,009 B2 | 9/2021 | Chen et al. |
| 11,139,537 B2 | 10/2021 | Wu et al. |
| 11,217,847 B2 | 1/2022 | Eftekhari et al. |
| 11,258,119 B2 | 2/2022 | Wang et al. |
| 11,264,669 B2 | 3/2022 | Jiang |
| 11,283,130 B2 | 3/2022 | Chen et al. |
| 11,289,750 B2 | 3/2022 | Zhou et al. |
| 11,302,972 B2 | 4/2022 | Chu et al. |
| 11,302,973 B2 | 4/2022 | Maguire et al. |
| 11,302,990 B2 | 4/2022 | Huang et al. |
| 11,329,347 B2 | 5/2022 | Huang et al. |
| 11,335,960 B2 | 5/2022 | Wang et al. |
| 11,362,392 B2 | 6/2022 | Wang et al. |
| 11,362,393 B2 | 6/2022 | Wang et al. |
| 11,387,519 B2 | 7/2022 | Huang et al. |
| 11,404,744 B1 | 8/2022 | Yang et al. |
| 11,417,932 B2 | 8/2022 | Tang et al. |
| 11,417,936 B2 | 8/2022 | Wang et al. |
| 2010/0259221 A1 | 10/2010 | Tabatowski-Bush |
| 2013/0164592 A1 | 6/2013 | Maguire et al. |
| 2013/0273404 A1 | 10/2013 | Ochi et al. |
| 2014/0045006 A1 | 2/2014 | Yoon et al. |
| 2017/0104251 A1 | 4/2017 | Wang |
| 2019/0305389 A1 | 10/2019 | Poirier et al. |
| 2020/0091494 A1 | 3/2020 | Fernandez-Galindo et al. |
| 2020/0203684 A1 | 6/2020 | Chen et al. |
| 2020/0203779 A1 | 6/2020 | Wang et al. |
| 2020/0212387 A1 | 7/2020 | Su et al. |
| 2020/0212397 A1 | 7/2020 | Wang et al. |
| 2020/0212418 A1 | 7/2020 | Chen et al. |
| 2020/0381697 A1 | 12/2020 | Fernandez-Galindo et al. |
| 2021/0066686 A1 | 3/2021 | Siewert et al. |
| 2021/0091348 A1 | 3/2021 | Lateef et al. |
| 2021/0091437 A1 | 3/2021 | Chen et al. |
| 2021/0104798 A1 | 4/2021 | Jiang et al. |
| 2021/0119279 A1 | 4/2021 | Wang et al. |
| 2021/0218117 A1 | 7/2021 | Zhu et al. |
| 2021/0229541 A1 | 7/2021 | Smith et al. |
| 2021/0305641 A1 | 9/2021 | Bai et al. |
| 2021/0305642 A1 | 9/2021 | Bai et al. |
| 2021/0320349 A1 | 10/2021 | Jiang et al. |
| 2021/0320372 A1 | 10/2021 | Jiang et al. |
| 2021/0402863 A1 | 12/2021 | Huang et al. |
| 2021/0408634 A1 | 12/2021 | Yin et al. |
| 2022/0052414 A1 | 2/2022 | Huang et al. |
| 2022/0052415 A1 | 2/2022 | Huang et al. |
| 2022/0059897 A1 | 2/2022 | Huang et al. |
| 2022/0059902 A1 | 2/2022 | Jiang et al. |
| 2022/0077521 A1 | 3/2022 | Jin et al. |
| 2022/0085450 A1 | 3/2022 | Chu et al. |
| 2022/0102800 A1 | 3/2022 | Wang et al. |
| 2022/0109211 A1 | 4/2022 | Wang et al. |
| 2022/0123394 A1 | 4/2022 | Zhang et al. |
| 2022/0123423 A1 | 4/2022 | Wang et al. |
| 2022/0149458 A1 | 5/2022 | Jiang et al. |
| 2022/0158296 A1 | 5/2022 | Chen et al. |
| 2022/0185088 A1 | 6/2022 | Zhang et al. |
| 2022/0190416 A1 | 6/2022 | Wu |
| 2022/0190423 A1 | 6/2022 | Wu et al. |
| 2022/0216555 A1 | 7/2022 | Huang et al. |
| 2022/0221084 A1 | 7/2022 | Huang et al. |
| 2022/0231370 A1 | 7/2022 | Yang et al. |
| 2022/0231371 A1 | 7/2022 | Jiang et al. |
| 2022/0255172 A1 | 8/2022 | Guo et al. |

FOREIGN PATENT DOCUMENTS

| | | | | |
|---|---|---|---|---|
| CN | 107757374 | A | 3/2018 | |
| CN | 208738329 | U | 4/2019 | |
| CN | 209016158 | U | 6/2019 | |
| CN | 209045657 | U | 6/2019 | |
| CN | 110048042 | A | 7/2019 | |
| CN | 209071465 | U | 7/2019 | |
| CN | 209104196 | U | 7/2019 | |
| CN | 209104221 | U | 7/2019 | |
| CN | 209104222 | U | 7/2019 | |
| CN | 209104228 | U | 7/2019 | |
| CN | 209104229 | U | 7/2019 | |
| CN | 209104230 | U | 7/2019 | |
| CN | 209104232 | U | 7/2019 | |
| CN | 209104234 | U | 7/2019 | |
| CN | 209104235 | U | 7/2019 | |
| CN | 209104236 | U | 7/2019 | |
| CN | 209104237 | U | 7/2019 | |
| CN | 209104238 | U | 7/2019 | |
| CN | 209104242 | U | 7/2019 | |
| CN | 209104331 | U | 7/2019 | |
| CN | 209183581 | U | 7/2019 | |
| CN | 209183604 | U | 7/2019 | |
| CN | 209183605 | U | 7/2019 | |
| CN | 209183611 | U | 7/2019 | |
| CN | 209183612 | U | 7/2019 | |
| CN | 209183614 | U | 7/2019 | |
| CN | 209249637 | U | 8/2019 | |
| CN | 209357799 | U | 9/2019 | |
| CN | 209401679 | U | 9/2019 | |
| CN | 209401680 | U | 9/2019 | |
| CN | 209401682 | U | 9/2019 | |
| CN | 209401684 | U | 9/2019 | |
| CN | 209401715 | U | 9/2019 | |
| CN | 209447908 | U | 9/2019 | |
| CN | 110350256 | A | 10/2019 | |
| CN | 209592271 | U | 11/2019 | |
| CN | 209607884 | U | 11/2019 | |
| CN | 209641720 | U | 11/2019 | |
| CN | 209710493 | U | 11/2019 | |
| CN | 209730104 | U | 12/2019 | |
| CN | 209747621 | U | 12/2019 | |
| CN | 209787546 | U | 12/2019 | |
| CN | 209843820 | U | 12/2019 | |
| CN | 209936788 | U | 1/2020 | |
| CN | 110931700 | A | 3/2020 | |
| CN | 210136922 | U | 3/2020 | |
| CN | 210136943 | U | 3/2020 | |
| CN | 210182435 | U | 3/2020 | |
| CN | 210467906 | U | * 5/2020 | .......... H01M 50/262 |
| CN | 210566905 | U | 5/2020 | |
| CN | 111354885 | A | 6/2020 | |
| CN | 210744037 | U | 6/2020 | |
| CN | 111384314 | B | 1/2021 | |
| CN | 111384325 | B | 2/2021 | |
| CN | 112310525 | A | 2/2021 | |
| CN | 112331982 | A | 2/2021 | |
| CN | 213071273 | U | * 4/2021 | .......... H01M 50/538 |
| CN | 109742281 | B | 5/2021 | |
| CN | 111354987 | B | 5/2021 | |
| CN | 111384337 | B | 5/2021 | |
| CN | 112331981 | B | 9/2021 | |

(56) References Cited

FOREIGN PATENT DOCUMENTS

| | | | |
|---|---|---|---|
| CN | 112331997 | B | 11/2021 |
| CN | 113871789 | A | 12/2021 |
| CN | 112310541 | B | 3/2022 |
| CN | 216054919 | U | 3/2022 |
| CN | 216120549 | U | 3/2022 |
| CN | 216120659 | U | 3/2022 |
| CN | 216213898 | U | 4/2022 |
| CN | 216354437 | U | 4/2022 |
| CN | 216354439 | U | 4/2022 |
| CN | 111430826 | B | 6/2022 |
| CN | 216720168 | U | 6/2022 |
| CN | 216720172 | U | 6/2022 |
| CN | 216750072 | U | 6/2022 |
| CN | 216750142 | U | 6/2022 |
| CN | 216872085 | U | 7/2022 |
| CN | 216903107 | U | 7/2022 |
| CN | 216903128 | U | 7/2022 |
| CN | 216903497 | U | 7/2022 |
| DE | 102016119118 | A1 | 4/2017 |
| DE | 102017121796 | A1 | 3/2018 |
| DE | 102019108631 | A1 | 10/2019 |
| DE | 102019125140 | A1 | 3/2020 |
| DE | 102020124986 | A1 | 3/2021 |
| DE | 102021101385 | A1 | 9/2021 |
| EP | 3671904 | A1 | 6/2020 |
| EP | 3671940 | A1 | 6/2020 |
| EP | 3672377 | A1 | 6/2020 |
| EP | 3675204 | A1 | 7/2020 |
| EP | 3675207 | A1 | 7/2020 |
| EP | 3675216 | B1 | 7/2020 |
| EP | 3675217 | A1 | 7/2020 |
| EP | 3675220 | A1 | 7/2020 |
| EP | 3675221 | A1 | 7/2020 |
| EP | 3675236 | A1 | 7/2020 |
| EP | 3675271 | A1 | 7/2020 |
| EP | 3798491 | A1 | 3/2021 |
| EP | 3799150 | A1 | 3/2021 |
| EP | 3799151 | A1 | 3/2021 |
| EP | 3905366 | A1 | 3/2021 |
| EP | 3806231 | A1 | 4/2021 |
| EP | 3852187 | A1 | 7/2021 |
| EP | 3920255 | A1 | 8/2021 |
| EP | 3883005 | A1 | 9/2021 |
| EP | 3883006 | A1 | 9/2021 |
| EP | 3883042 | A1 | 9/2021 |
| EP | 3886198 | A1 | 9/2021 |
| EP | 3886200 | A1 | 9/2021 |
| EP | 3886201 | A1 | 9/2021 |
| EP | 3671893 | B1 | 11/2021 |
| EP | 3699979 | B1 | 11/2021 |
| EP | 3920315 | A1 | 12/2021 |
| EP | 3930027 | A1 | 12/2021 |
| EP | 3944397 | A1 | 1/2022 |
| EP | 3944398 | A1 | 1/2022 |
| EP | 3955333 | A1 | 2/2022 |
| EP | 3799194 | B1 | 3/2022 |
| EP | 3985787 | A1 | 4/2022 |
| EP | 3799153 | B1 | 6/2022 |
| IN | 110416448 | A | 11/2019 |
| JP | 2010246372 | A | 10/2010 |
| KR | 1020100112530 | A | 10/2010 |
| KR | 101695641 | B1 | 1/2017 |

* cited by examiner

ENCLOSURE COVER ATTACHMENT CONFIGURATIONS FOR TRACTION BATTERY PACKS WITH CELL-TO-PACK BATTERY SYSTEMS

CROSS-REFERENCE TO RELATED APPLICATIONS

This disclosure claims priority to U.S. Provisional Application No. 63/322,766, which was filed on Mar. 23, 2022 and is incorporated herein by reference.

TECHNICAL FIELD

This disclosure relates generally to traction battery packs, and more particularly to cover attachments for securing an enclosure cover in place on traction battery packs that include cell-to-pack battery systems.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack can power the electric machines and other electrical loads of the vehicle.

Conventional traction battery packs include groupings of battery cells called battery arrays. The battery arrays include various array support structures (e.g., array frames, spacers, rails, walls, end plates, bindings, etc.) that are arranged for grouping and supporting the battery cells in multiple individual units inside the traction battery pack enclosure.

SUMMARY

A traction battery pack according to an exemplary aspect of the present disclosure includes, among other things, an enclosure assembly including an enclosure cover and an enclosure tray, a battery system housed within the enclosure assembly and including a separator, and a cover attachment arranged to secure the enclosure cover to the separator.

In a further non-limiting embodiment of the foregoing traction battery pack, the separator is a cell row separator that is positioned between a first cell stack and a second cell stack of the battery system.

In a further non-limiting embodiment of either of the foregoing traction battery packs, the separator is a battery cell separator that is positioned between a first battery cell and a second battery cell of a cell stack of the battery system.

In a further non-limiting embodiment of any of the foregoing traction battery packs, the battery system is a cell-to-pack battery system, and the enclosure tray provides a cell-compressing opening for compressing a cell matrix of the cell-to-pack battery system.

In a further non-limiting embodiment of any of the foregoing traction battery packs, a structural adhesive is received between a first projection and a second projection of the separator.

In a further non-limiting embodiment of any of the foregoing traction battery packs, the separator is a polymer-based component that is not mounted directly to the enclosure tray.

In a further non-limiting embodiment of any of the foregoing traction battery packs, the cover attachment engages a stanchion of the separator.

In a further non-limiting embodiment of any of the foregoing traction battery packs, the cover attachment includes a clip having a bridge mounted to the enclosure cover and a pair of flexible legs that engage the stanchion.

In a further non-limiting embodiment of any of the foregoing traction battery packs, the cover attachment includes an adhesive secured to both the enclosure cover and the stanchion.

In a further non-limiting embodiment of any of the foregoing traction battery packs, the cover attachment includes a magnet mounted to the stanchion.

In a further non-limiting embodiment of any of the foregoing traction battery packs, the cover attachment includes a first touch fastener mounted to the enclosure cover and a second touch fastener mounted to the stanchion.

In a further non-limiting embodiment of any of the foregoing traction battery packs, the cover attachment includes a ball-and-socket assembly.

A traction battery pack according to another exemplary aspect of the present disclosure includes, among other things, an enclosure assembly including an enclosure cover and an enclosure tray, a cell-to-pack battery system housed within the enclosure assembly and including a first cell stack, a second cell stack, and a cell row separator secured to both the first cell stack and the second cell stack, and a cover attachment arranged to secure the enclosure cover to a stanchion of the cell row separator.

In a further non-limiting embodiment of the foregoing traction battery pack, the cell row separator is a polymer-based component.

In a further non-limiting embodiment of either of the foregoing traction battery packs, the cover attachment includes a clip having a bridge mounted to the enclosure cover and a pair of flexible legs that engage the stanchion.

In a further non-limiting embodiment of any of the foregoing traction battery packs, the cover attachment includes an adhesive puck secured to both the enclosure cover and the stanchion.

In a further non-limiting embodiment of any of the foregoing traction battery packs, the cover attachment includes a first magnet mounted to the enclosure cover and a second magnet mounted to the stanchion.

In a further non-limiting embodiment of any of the foregoing traction battery packs, the cover attachment includes a first touch fastener mounted to the enclosure cover and a second touch fastener mounted to the stanchion.

In a further non-limiting embodiment of any of the foregoing traction battery packs, the cover attachment includes a ball-and-socket assembly.

In a further non-limiting embodiment of any of the foregoing traction battery packs, the cell row separator includes a base, a first projection that extends from the base, and a second projection that extends from the base. A structural adhesive is received within a gap extending between the first projection and the second projection.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details cover attachments for securing an enclosure cover to a cell row/battery cell separator on traction battery packs that include cell-to-pack battery systems. One or more separators of a cell-to-pack battery system may be configured to separate cell stack rows or battery cells within the cell-to-pack battery system. A cover attachment (e.g., a clip, an adhesive puck, a magnet assembly, a hook and loop assembly, a ball-and-socket assembly, etc.) may connect to a portion of the separator for securing the enclosure cover directly to the cell-to-pack battery system. The combination of the cover attachments and the separators provides for enclosure cover retention at interior regions of the cell-to-pack battery system, maintains the enclosure cover at a spaced distance apart from the battery cells of the cell-to-pack battery system, and creates a desired amount of pack-level stiffness for distributing loads through the cell-to-pack battery system. These and other features are discussed in greater detail in the following paragraphs of this detailed description.

Figure 1:
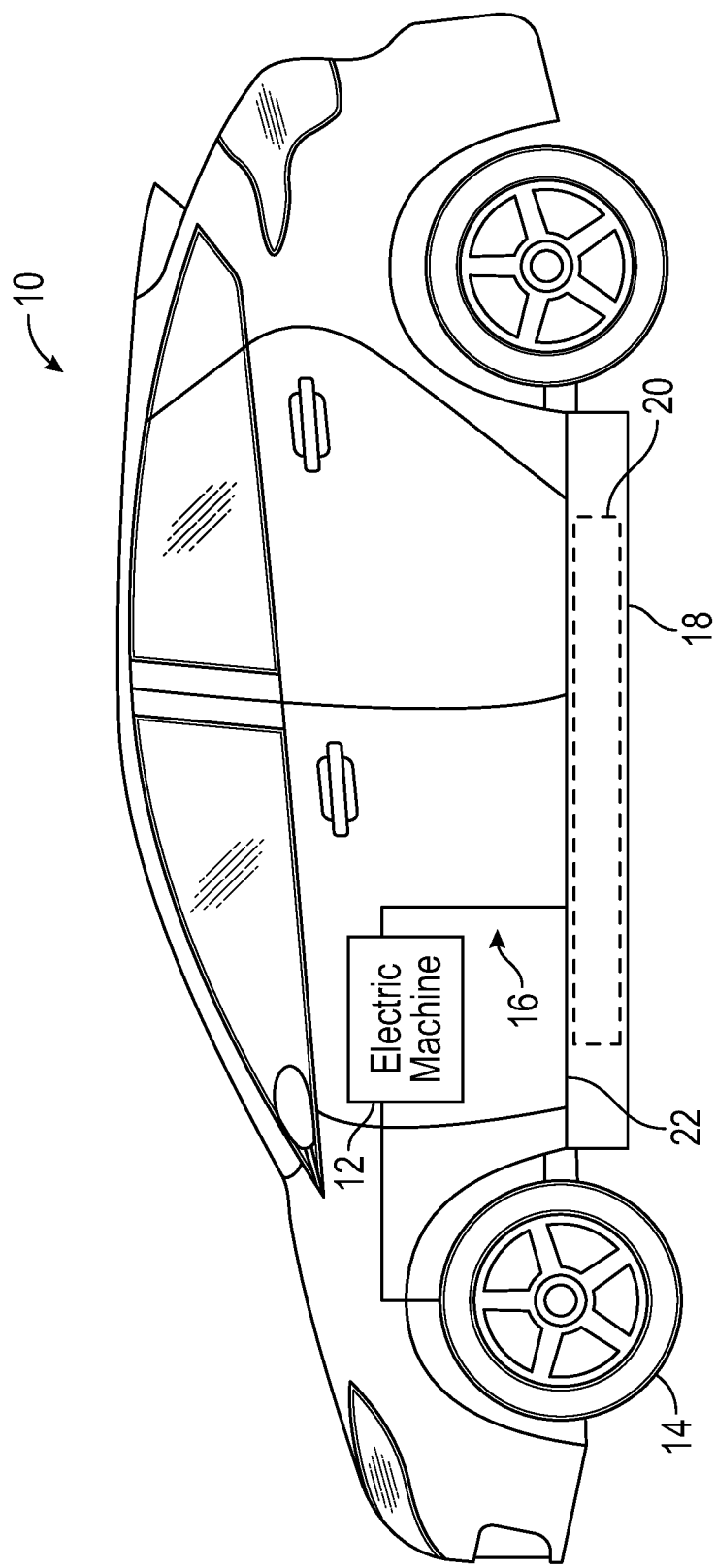
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in the exemplary embodiment, the electrified vehicle 10 could be equipped with an internal combustion engine that can be employed either alone or in combination with other power sources to propel the electrified vehicle 10.

In an embodiment, the electrified vehicle 10 is a car. However, the electrified vehicle 10 could alternatively be a pickup truck, a van, a sport utility vehicle (SUV), or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more drive wheels 14 of the electrified vehicle 10.

A voltage bus 16 may electrically couple the electric machine 12 to a traction battery pack 18. The traction battery pack 18 is capable of outputting electrical power to power the electric machine 12 and/or other electrical loads of the electrified vehicle 10.

The traction battery pack 18 may be secured to an underbody 22 of the electrified vehicle 10. However, the traction battery pack 18 could be located elsewhere on the electrified vehicle 10 within the scope of this disclosure.

The traction battery pack 18 is an exemplary electrified vehicle battery. The traction battery pack 18 may be a high voltage traction battery pack that includes a cell-to-pack battery system 20. Unlike conventional traction battery pack battery systems, the cell-to-pack battery system 20 incorporates battery cells or other energy storage devices without the cells being arranged in individual arrays or modules. The cell-to-pack battery system 20 therefore eliminates most if not all the array support structures (e.g., array frames, spacers, rails, walls, end plates, bindings, etc.) necessary for grouping the battery cells into the arrays/modules. Further, the cell-to-pack battery system 20 may provide the total high voltage bus electrical potential of the traction battery pack 18 with a single battery unit as opposed to conventional battery systems that require multiple individual battery arrays/modules that must be connected together after being positioned within the battery enclosure for achieving the total high voltage electrical potential.

Figure 2:
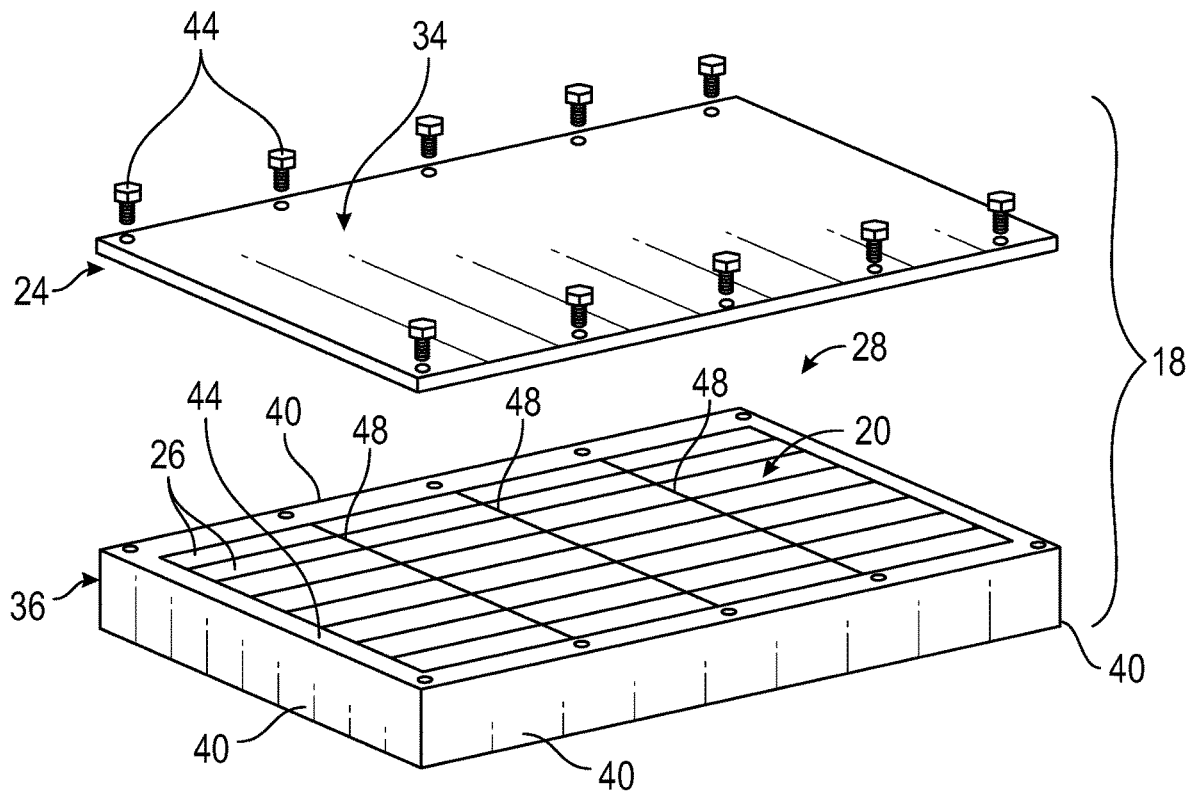
FIG. 2 illustrates a traction battery pack of the electrified vehicle of FIG. 1.
Figure 3:
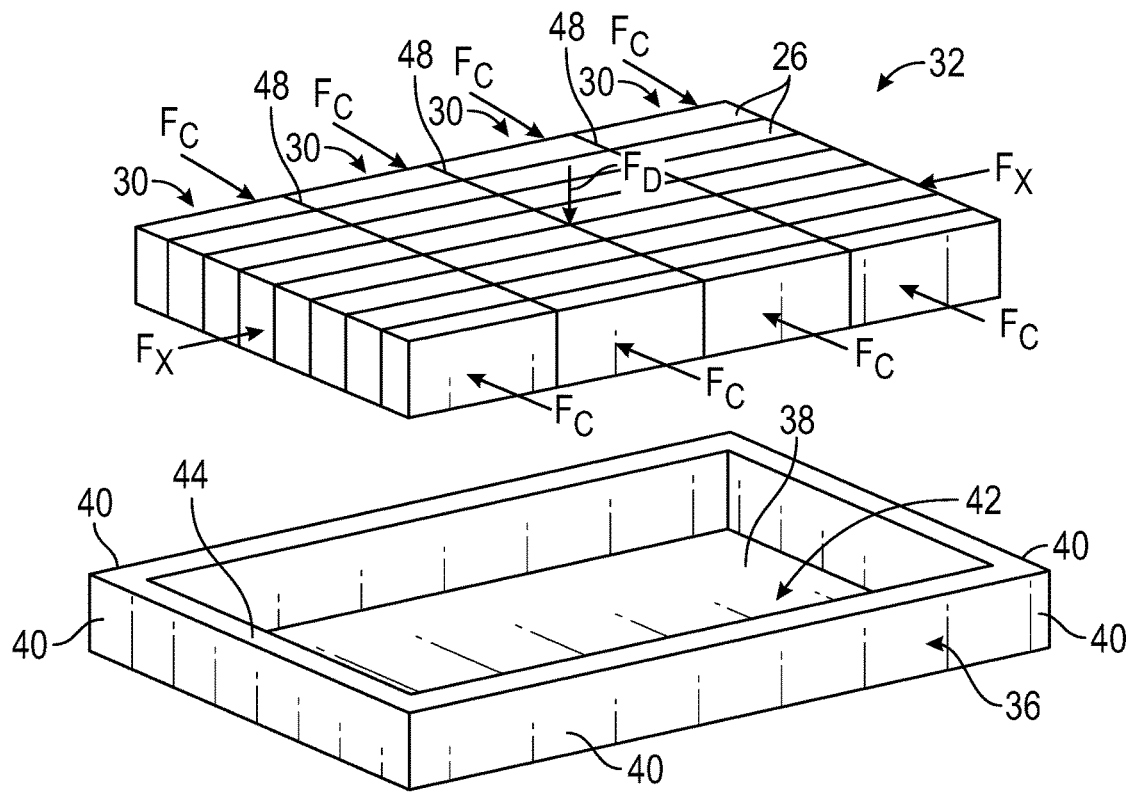
FIG. 3 illustrates a cell-to-pack battery system of the traction battery pack of FIG. 2.

Referring now to FIGS. 2 and 3, the traction battery pack 18 may include an enclosure assembly 24 that is arranged for housing the cell-to-pack battery system 20. In an embodiment, the cell-to-pack battery system 20 includes a plurality of battery cells 26 that are held within an interior area 28 established by the enclosure assembly 24.

The battery cells 26 may supply electrical power to various components of the electrified vehicle 10. The battery cells 26 may be stacked side-by-side relative to one another to construct a cell stack 30, and the cell stacks 30 may be positioned side-by-side in rows to provide a cell matrix 32.

In an embodiment, each cell stack 30 includes eight individual battery cells 26, and the cell matrix 32 includes four cell stacks 30 for a total of thirty-two battery cells 26. Providing an even quantity of battery cells 26 and an even quantity of cell stacks 30 can help to support an efficient electrical bussing arrangement. Although a specific number of battery cells 26 and cells stacks 30 are illustrated in the various figures of this disclosure, the cell-to-pack battery system 20 of the traction battery pack 18 could include any number of battery cells 26 and any number of cell stacks 30. In other words, this disclosure is not limited to the exemplary configuration shown in FIGS. 2 and 3.

In an embodiment, the battery cells 26 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

The enclosure assembly 24 of the traction battery pack 18 may include an enclosure cover 34 and an enclosure tray 36. The enclosure cover 34 may be secured to the enclosure tray 36 to provide the interior area 28 for housing the cell-to-pack battery system 20.

The enclosure tray 36 may include a floor 38 and a plurality of side walls 40 arranged relative to one another to provide a cell-compressing opening 42. The floor 38 and the side walls 40 may be mechanically coupled to one another, such as by welding, for example.

During assembly of the traction battery pack 18, the enclosure cover 34 may be secured to the enclosure tray 36 at an interface 44 that substantially circumscribes the interior area 28. In some implementations, mechanical fasteners 46 may be used to secure the enclosure cover 34 to the enclosure tray 36, although other fastening methodologies (adhesion, etc.) could also be suitable. As further discussed below, the enclosure cover 34 may be directly coupled to the cell-to-pack battery system 20.

The cell matrix 32 of the cell-to-pack battery system 20 may be positioned within the cell-compressing opening 42 provided by the enclosure tray 36. The exemplary enclosure tray 36 is depicted as including a single cell-compressing opening 42, however it should be understood that this disclosure extends to structural assemblies that provide one or more cell-compressing openings. The enclosure cover 34 may cover the cell matrix 32 within the cell-compressing opening 42 to substantially surround the battery cells 26 on all sides. Once fully assembled and positioned relative to the enclosure tray 36, the cell matrix 32 may establish a single battery unit capable of providing the total high voltage bus electrical potential of the traction battery pack 18.

The enclosure tray 36 may compress and hold the cell matrix 32 when the cell matrix 32 is received within the cell-compressing opening 42. In an embodiment, the side walls 40 of the enclosure tray 36 apply forces to the cell matrix 32 when the cell matrix 32 is positioned within the cell-compressing opening 42.

In an embodiment, in order to insert the cell matrix 32 into the cell-compressing opening 42, the cell matrix 32 may first be compressed, and then, while compressed, moved into place in the cell-compressing opening 42. A compressive force $F_C$ may be applied to opposed ends of one of the cell stacks 30. The compressive force $F_C$ essentially squeezes the battery cells 26 within the cell stack 30, thereby compressing the cell stack 30 and the individual battery cells 26 to a reduced thickness. While the compressive force $F_C$ is applied to the cell stack 30, the cell stack 30 may be inserted into a respective cell-compressing opening 42 by a downward force $F_D$. The downward force $F_D$ may be applied directly to one or more of the battery cells 26.

While the term "downward" is used herein to describe the downward force $F_D$, it should be understood that the term "downward" is used herein to refer to all forces tending to press a cell stack 30 into a cell compressing opening 42. In particular, the term "downward" refers to all forces substantially perpendicular to the compressive force $F_C$, whether or not the force is truly in a "downward" direction. For example, this disclosure extends to cell stacks that are compressed and inserted into a cell-compressing opening in a sideways direction.

The cell stacks 30 could be individually compressed and inserted into the cell-compressing opening 42. In another embodiment, the entire cell matrix 32 is compressed and inserted into the cell-compressing opening 42. As schematically shown in FIG. 3, in such an embodiment, additional compressive forces $F_X$ can compress the cell stacks 30 together for insertion of the cell matrix 32 into the cell-compressing opening 42. The compressive forces $F_X$ are generally perpendicular to the compressive forces $F_C$. The compressive forces $F_X$ may be applied together with the compressive forces $F_C$. The force $F_D$ may then be applied to move the entire cell matrix 32 into the cell-compressing opening 42.

In an embodiment, an entire perimeter of the cell-compressing opening 42 is defined by the side walls 40 of the enclosure tray 36. The side walls 40 can apply a compressive force to the battery cells 26 about the entire perimeter of the cell matrix 32. The side walls 40 may therefore function as a rigid halo-type structure that compresses and tightly holds the cell matrix 32.

The configuration described above is considered to be a cell-to-pack type battery pack, which differs from conventional battery pack types that include enclosures holding arrays of battery cells enclosed by array support structures that are spaced apart from walls of a battery enclosure, and where the battery enclosure does not apply compressive forces to any of the battery cells. The cell-to-pack type battery pack described herein also eliminates the rigid cross members that are commonly secured to the enclosure tray of conventional traction battery backs for providing mounting points for securing the battery arrays and the enclosure cover.

The cell-to-pack battery system 20 may further include one or more cell row separators 48. In an embodiment, one cell row separator 48 is positioned between each adjacent pair of cell stacks 30 of the cell matrix 32. In other embodiments, two cell row separators 48 are provided with each cell stack 30. However, the total number of cell row separators 48 provided within the cell-to-pack battery system 20 is not intended to limit this disclosure.

As further detailed below, the cell row separators 48 may provide various functions and advantages to the cell-to-pack battery system 20, including but not limited to maintaining battery cells 26 of adjacent cell stacks 30 spaced apart from one another, adding stiffness across the cell matrix 32 to prevent drooping and/or buckling, providing mounting points for securing the enclosure cover 34 directly to the cell-to-pack battery system 20, etc. The functionality provided by the cell row separators 48 described herein may be particularly beneficial for traction battery packs that include cell-to-pack type battery systems because the array support structures traditionally provided within battery arrays has been largely eliminated from the cell-to-pack battery system 20, and the rigid cross members traditionally provided for establishing mounting points for the enclosure cover 34 have been eliminated from the enclosure tray 36.

Figure 4:
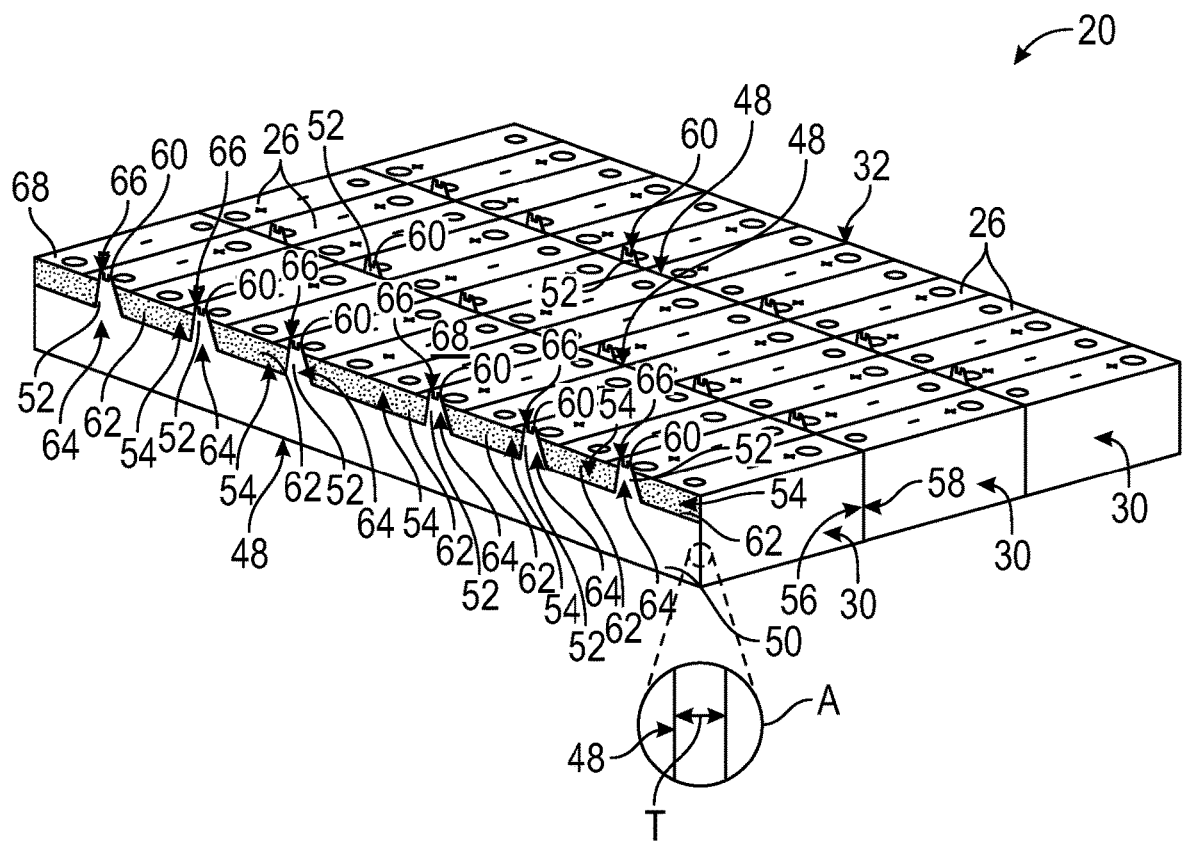
FIG. 4 illustrates an exemplary separator of a cell-to-pack battery system.

FIG. 4, with continued reference to FIGS. 1-3, illustrates an exemplary design of a cell row separator 48 for use within the cell-to-pack battery system 20. The cell row separator 48 may be a polymer-based component. For example, the cell row separator 48 could be constructed out of a sheet moulding compound (e.g., glass-fiber reinforced polyester), polypropylene, polyamide, etc.

The cell row separator 48 may include a relatively nominal thickness T (see inset A) at locations of the cell row separator 48 that are disposed between adjacent cell stacks 30. In some embodiments, the thickness T may be between about 1 mm and about 2 mm, although other thicknesses may also be suitable. The thickness T is therefore much smaller than that provided by highly structural cross members of conventional traction battery packs. In this disclosure, the term "about" means that the expressed quantities or ranges need not be exact but may be approximated and/or larger or smaller, reflecting acceptable tolerances, conversion factors, measurement error, etc.

The cell row separator 48 may include a base 50 and a plurality of finger-like projections 52 that protrude upwardly from the base 50. Together, the base 50 and the projections 52 may establish a unitary, single-piece structure of the cell row separator 48.

The projections 52 may be spaced apart from one another along a length of the base 50. The total number of projections 52 provided within the cell row separator 48 is not intended to limit this disclosure. Due to their spaced relationship, a gap 54 may extend between each adjacent pair of projections 52.

The projections 52 may extend vertically away from the base 50 along longitudinal axes that are parallel to one another. Each projection 52 may include a cantilevered design that extends between a proximal end portion 64 proximate the base 50 and a distal end portion 66 that is spaced from the base 50. The projections 52 may extend to any desired height above the battery cells 26 of the cell stacks 30.

In an embodiment, each projection 52 tapers in a direction toward the distal end portion 66. However, other configurations could also be possible.

The cell row separator 48 may further include a first side surface 56 and a second side surface 58 that is opposed to the first side surface 56. The first side surface 56 may be secured directly to the battery cells 26 of one of the cell stacks 30, and the second side surface 58 may be secured to an adjacent cell stack 30 of the cell matrix 32. In an embodiment, different types of adhesion may be used on the opposite sides surfaces 56, 58 of the cell row separator 48. For example, a more structural adhesion may be utilized on the side that is referenced to a common datum.

In an embodiment, the cell row separator 48 is secured to one or more longitudinally extending sides of the cell stack 30. However, the cell row separator 48 could be secured to any side of the cell stack 30. Notably, the cell row separator 48 is not secured directly to the enclosure tray 36 when the cell matrix 32 is received within the cell-compressing opening 42.

Each cell row separator 48 may be secured to one or more cell stacks 30, such as with one or more sections of two-sided adhesive tape or any other suitable adhesive (not shown). When positioned between adjacent cell stacks 30, the cell row separator 48 may prevent the battery cells 26 of the adjacent cell stacks 30 from contacting one another.

The gaps 54 may establish open areas between the cell stacks 30 for receiving a structural adhesive 62. The projections 52, the base 50, and the battery cells 26 of the adjacent cell stacks 30 may establish a containment perimeter about the structural adhesive 62 for confining the adhesive to desired locations of the cell matrix 32. Once cured, the structural adhesive 62 can add stiffness to the cell matrix 32, thereby preventing drooping and/or buckling and structurally coupling the cell stacks 30 together. The structural adhesive 62 may be an epoxy or any other suitable adhesive.

One or more of the projections 52 of the cell row separator 48 may include a stanchion 60. The stanchion 60 may be disposed at the distal end portion 66 of the projection 52. The stanchions 60 may include a thickness that is greater than a thickness of the reaming portion of the projection 52. In an embodiment, the thickness of the stanchion 60 is about two to about three times larger than the thickness of the remaining portion of the projection 52. The stanchions 60 may be rectangular-shaped, although other shapes could also be utilized within the scope of this disclosure.

The stanchions 60 may extend to a location above upper surfaces 68 of battery cells 26 of the cell stacks 30. The stanchions 60 may therefore sit proud of the cells stacks 30 and may be positioned within the open space extending between the enclosure cover 34 and the cell matrix 32.

Figure 5:
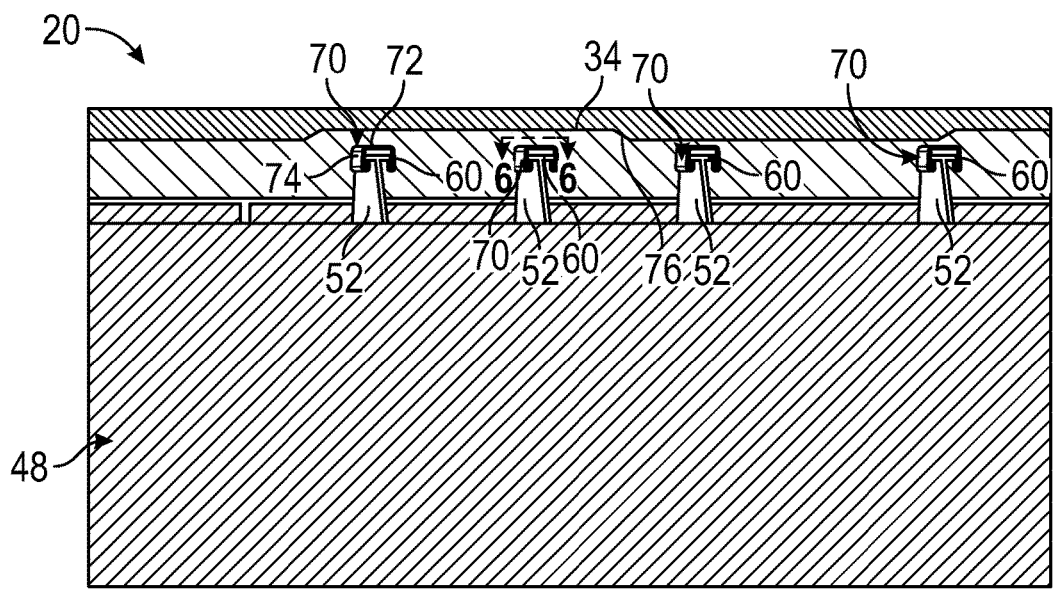
FIG. 5 illustrates an interface between a separator and an enclosure cover of a traction battery pack having a cell-to-pack battery system.
Figure 6:
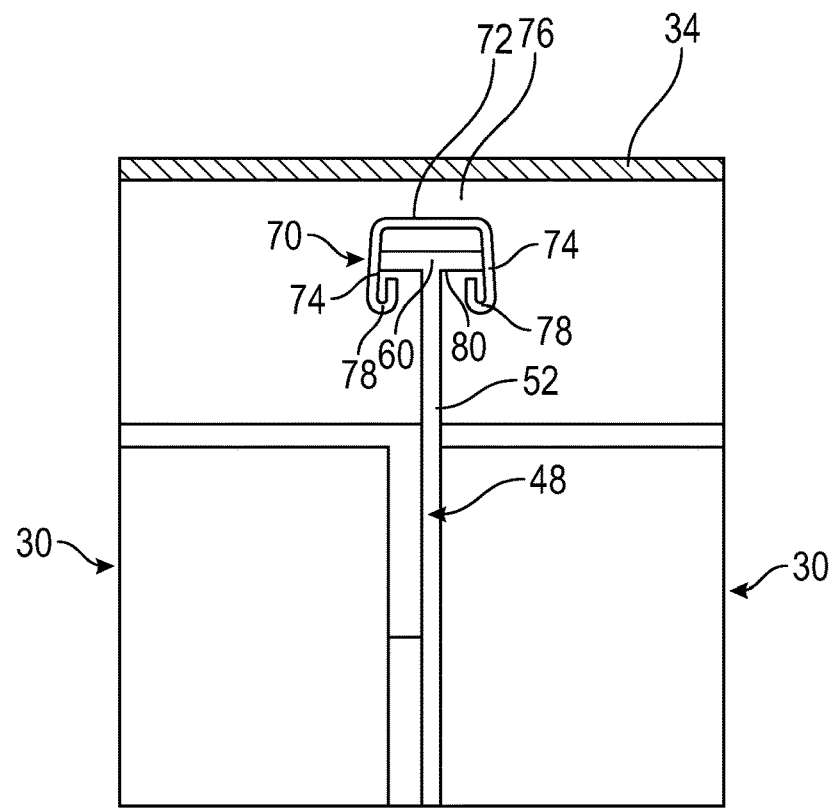
FIG. 6 is a cross-sectional view through section 6-6 of FIG. 5.

Referring now to FIGS. 5-6, with continued reference to FIGS. 1-4, each stanchion 60 of each cell row separator 48 may provide a mounting point for mounting the enclosure cover 34 directly to the cell row separator 48 (and thus directly to the cell-to-pack battery system 20). For example, each stanchion 60 may interface with a cover attachment 70 that is mounted to the enclosure cover 34 for securing the enclosure cover 34 in place at interior regions of the cell-to-pack battery system 20 that are spaced inwardly from the interface 44 established by the enclosure tray 36. The cover attachment 70 may connect to the stanchion 60 as the enclosure cover 34 is moved into place over the cell-to-pack battery system 20.

In an embodiment, the cover attachment 70 is a clip that includes a bridge 72 and a pair of flexible legs 74 that extend from the bridge 72. The bridge 72 may be mounted (e.g., welded) to an interior surface 76 of the enclosure cover 34, and the pair of flexible legs 74 may interface with the stanchion 60 for securing the enclosure cover 34 to the cell row separator 48.

Figure 7:
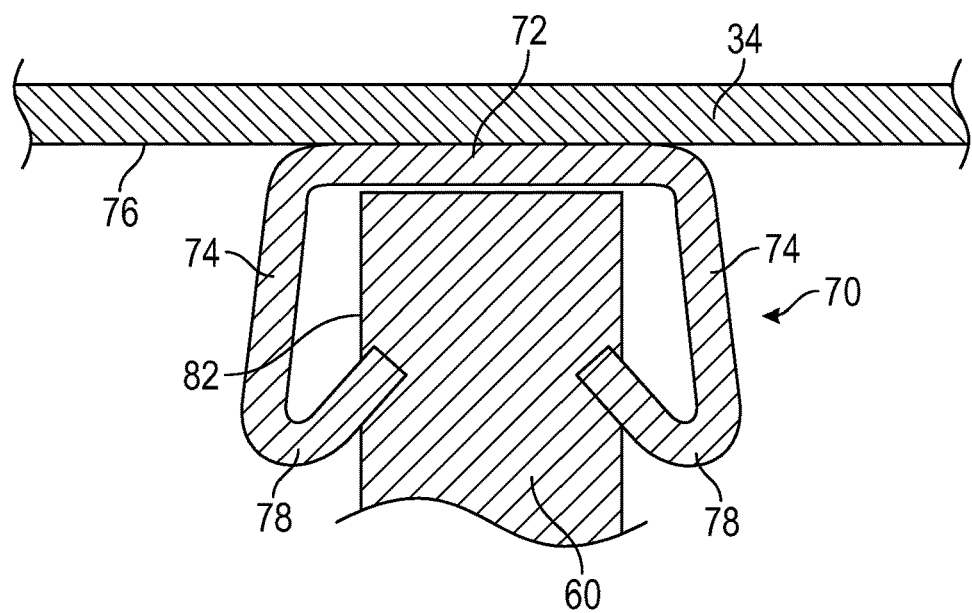
FIG. 7 illustrates an exemplary cover attachment design for engaging a stanchion of a separator.

Each flexible leg 74 may include a hooked portion 78. The flexible legs 74 may flex outwardly when the cover attachment 70 is moved into contact with the stanchion 60, and may flex back toward one another once the hooked portions 78 clear a thickness of the stanchion 60. In an embodiment, the hooked portions 78 may engage a bottom surface 80 of the stanchion 60 when the enclosure cover 34 is fully pushed into place. In another embodiment, the hooked portions 78 may engage a side surface 82 of the stanchion 60 when the enclosure cover 34 is fully pushed into place (see, e.g., FIG. 7). The hooked portions 78 could alternatively engage (e.g., snap into) portions of the stanchion 60.

Figure 8:
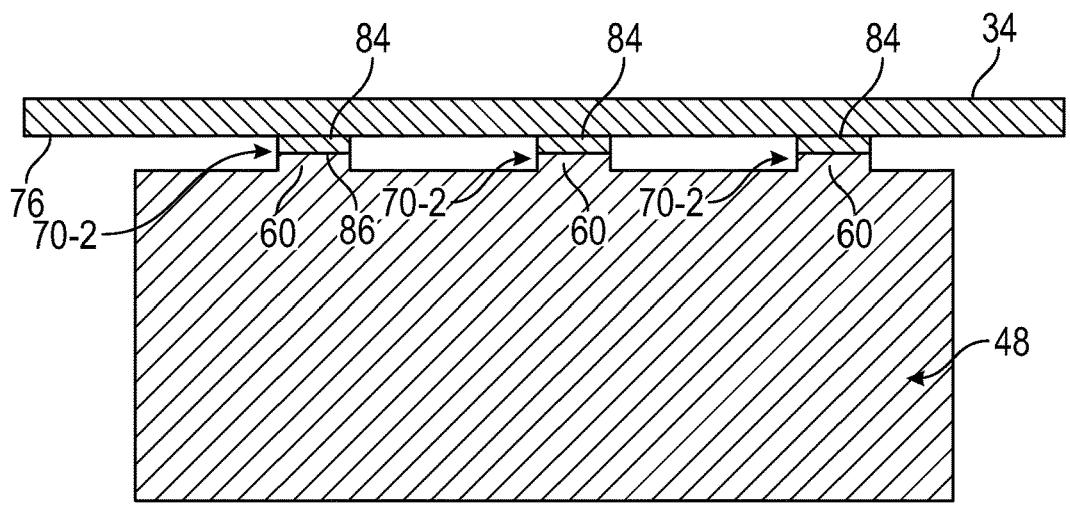
FIG. 8 illustrates another exemplary cover attachment for securing an enclosure cover to a separator of a cell-to-pack battery system.

FIG. 8 illustrates another exemplary cover attachment 70-2 for securing the enclosure cover 34 directly to the stanchion(s) 60 of the cell row separator 48. In this embodiment, the cover attachment 70-2 includes an adhesive puck 84. The adhesive puck 84 may adhere to the interior surface 76 of the enclosure cover 34 and to a top surface 86 of the stanchion 60 for securing the enclosure cover 34 to the cell row separator 48.

Figure 9:
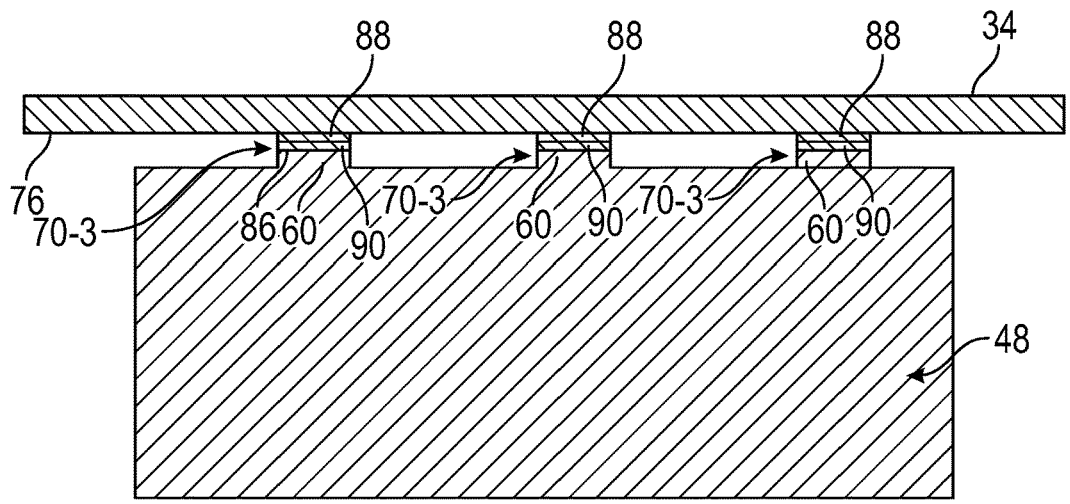
FIG. 9 illustrates another exemplary cover attachment for securing an enclosure cover to a separator of a cell-to-pack battery system.

FIG. 9 illustrates another exemplary cover attachment 70-3 for securing the enclosure cover 34 directly to the stanchion(s) 60 of the cell row separator 48. In this embodiment, the cover attachment 70-3 is a magnet assembly that includes a first magnet 88 secured to the interior surface 76 of the enclosure cover 34 and a second magnet 90 secured to the top surface 86 of the stanchion 60. The first magnet 88 may magnetically connect to the second magnet 90 as the enclosure cover 34 is moved into place over the cell-to-pack battery system 20. In other implementations, only a single magnet may be required to attract the ferrous material of the enclosure cover 34.

Figure 10:
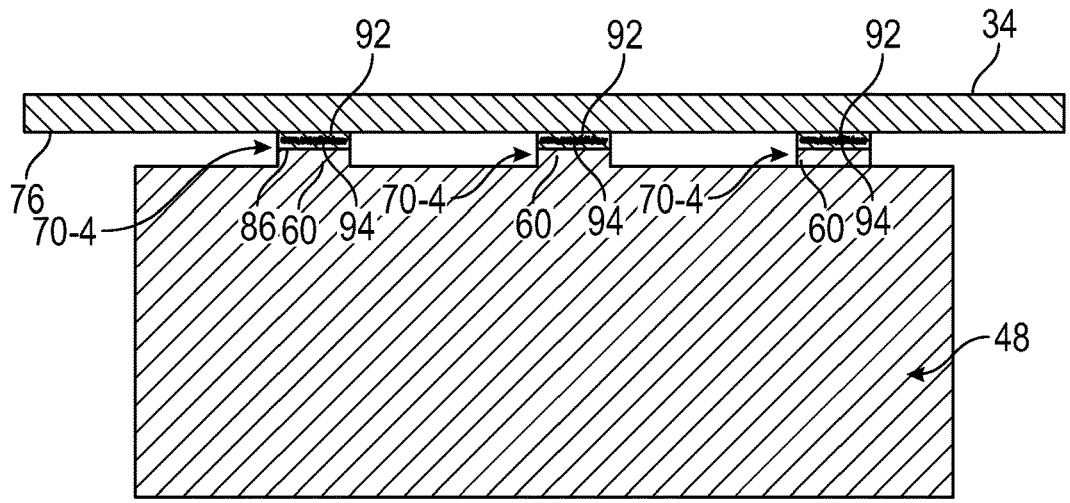
FIG. 10 illustrates yet another exemplary cover attachment for securing an enclosure cover to a separator of a cell-to-pack battery system.

FIG. 10 illustrates another exemplary cover attachment 70-4 for securing the enclosure cover 34 directly to the stanchion(s) 60 of the cell row separator 48. In this embodiment, the cover attachment 70-4 is a hook-and-loop fastener assembly that includes a first touch fastener 92 secured to the interior surface 76 of the enclosure cover 34 and a second touch fastener 94 secured to the top surface 86 of the stanchion 60. The first touch fastener 92 may bind to the second touch fastener 94 as the enclosure cover 34 is moved into place over the cell-to-pack battery system 20.

Suitable touch fasteners are commercially available under the trademark VELCRO from the Velcro Industries B.V. In an embodiment, the first touch fastener 92 may include relatively small hooks of material that are adapted to engage relatively small loops of material of the second touch fastener 94. Of course, an opposite configuration is also contemplated in which the first touch fastener 92 includes the loops and the second touch fastener 94 include the hooks.

Figure 11:
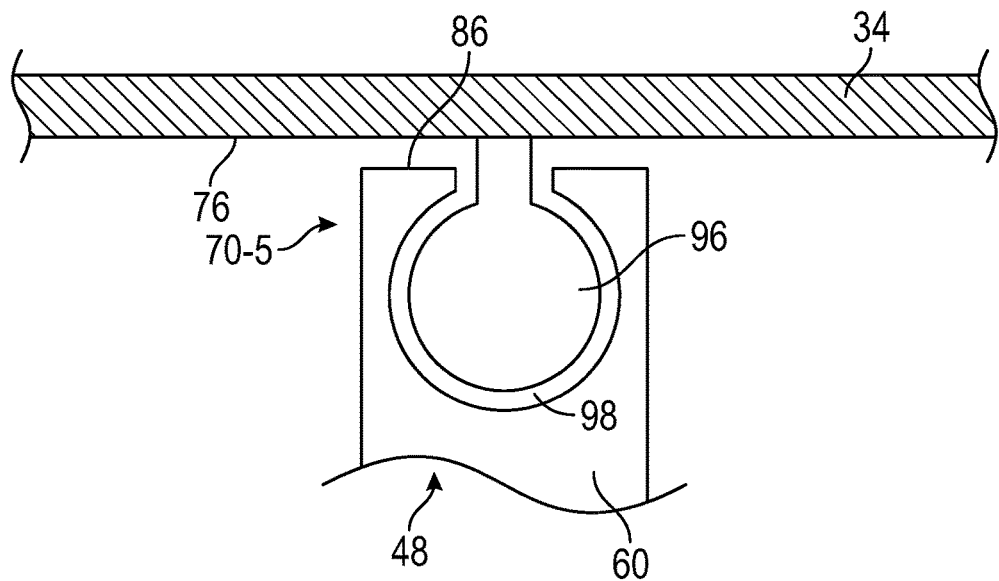
FIG. 11 illustrates yet another exemplary cover attachment for securing an enclosure cover to a separator of a cell-to-pack battery system.

FIG. 11 illustrates yet another exemplary cover attachment 70-5 for securing the enclosure cover 34 directly to the stanchion 60 of the cell row separator 48. In this embodiment, the cover attachment 70-5 is a ball-and-sock assembly that includes a ball portion 96 secured to the interior surface 76 of the enclosure cover 34 and a socket portion 98 formed in the top surface 86 of the stanchion 60. The socket portion 98 may receive the ball portion 96 as the enclosure cover 34 is moved into place over the cell-to-pack battery system 20.

Figure 12:
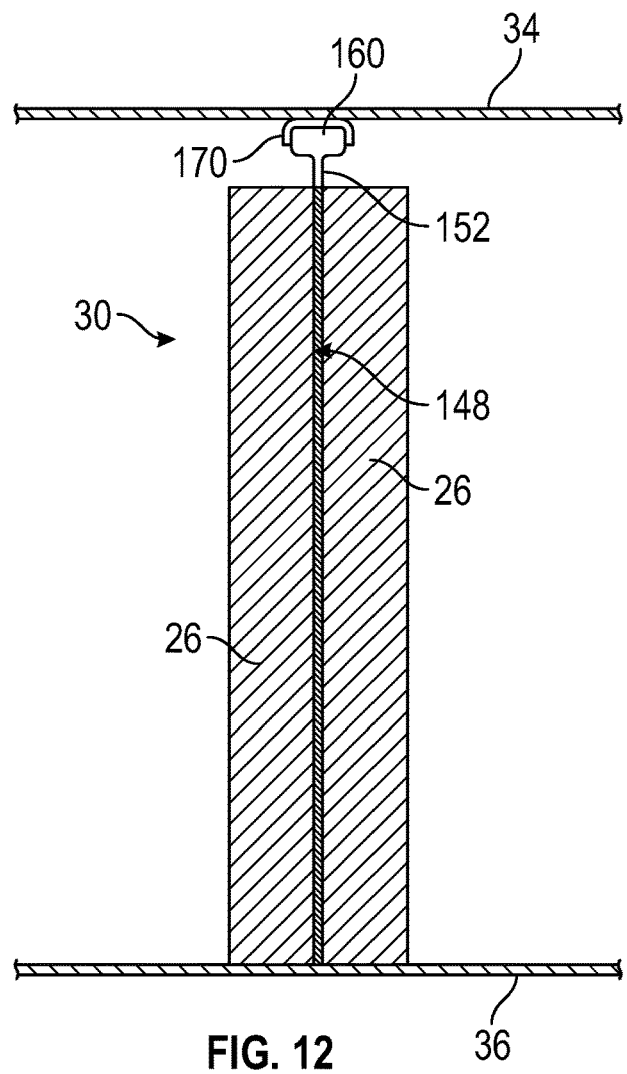
FIG. 12 illustrates another exemplary separator of a cell-to-pack battery system.

In the above embodiments, the mounting points for receiving the cover attachments are provided by the stanchions 60 of the cell row separators 48. However, the mounting points could alternatively or additionally be provided by stanchions of one or more battery cell separators 148. An exemplary battery cell separator 148 is illustrated in FIG. 12 and may be positioned between adjacent battery cells 26 of a cell stack 30 of a cell-to-pack battery system. The battery cell separator 148 may include projections 152 that each include a stanchion 160. A cover attachment 170 may engage the stanchion 160 for securing the enclosure cover 34 directly to the battery cell separator 148.

The exemplary separators of this disclosure provide mounting points for securing an enclosure cover directly to a cell-to-pack battery system of a traction battery pack without creating additional holes in the cover. The separators may provide mounting solutions to various assembly complexities that can arise as a result of eliminating much of the array support structures and tray rigid cross members associated with convention traction battery packs.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack, comprising:
an enclosure assembly including an enclosure cover and an enclosure tray;
a battery system housed within the enclosure assembly and including a separator, wherein the separator is a polymer-based component that is not mounted directly to the enclosure tray and
a cover attachment arranged to secure the enclosure cover to the separator.

2. The traction battery pack as recited in claim 1, wherein the separator is a cell row separator that is positioned between a first cell stack and a second cell stack of the battery system.

3. The traction battery pack as recited in claim 1, wherein the separator is a battery cell separator that is positioned between a first battery cell and a second battery cell of a cell stack of the battery system.

4. The traction battery pack as recited in claim 1, wherein the battery system is a cell-to-pack battery system, and further wherein the enclosure tray provides a cell-compressing opening for compressing a cell matrix of the cell-to-pack battery system.

5. The traction battery pack as recited in claim 1, wherein the cover attachment engages a stanchion of the separator.

6. The traction battery pack as recited in claim 5, wherein the cover attachment includes a clip having a bridge mounted to the enclosure cover and a pair of flexible legs that engage the stanchion.

7. The traction battery pack as recited in claim 5, wherein the cover attachment includes an adhesive secured to both the enclosure cover and the stanchion.

8. The traction battery pack as recited in claim 5, wherein the cover attachment includes a magnet mounted to the stanchion.

9. The traction battery pack as recited in claim 5, wherein the cover attachment includes a first touch fastener mounted to the enclosure cover and a second touch fastener mounted to the stanchion.

10. The traction battery pack as recited in claim 5, wherein the cover attachment includes a ball-and-socket assembly.

11. A traction battery pack, comprising:
an enclosure assembly including an enclosure cover and an enclosure tray;
a battery system housed within the enclosure assembly and including a separator;
a cover attachment arranged to secure the enclosure cover to the separator; and
a structural adhesive received between a first projection and a second projection of the separator.

12. A traction battery pack, comprising:
an enclosure assembly including an enclosure cover and an enclosure tray;
a cell-to-pack battery system housed within the enclosure assembly and including a first cell stack, a second cell stack, and a cell row separator secured to both the first cell stack and the second cell stack; and
a cover attachment arranged to secure the enclosure cover to a stanchion of the cell row separator; and a structural adhesive received between a first projection and a second projection of the cell row separator.

13. The traction battery pack as recited in claim 12, wherein the cell row separator is a polymer-based component.

14. The traction battery pack as recited in claim 12, wherein the cover attachment includes a clip having a bridge mounted to the enclosure cover and a pair of flexible legs that engage the stanchion.

15. The traction battery pack as recited in claim 12, wherein the cover attachment includes an adhesive puck secured to both the enclosure cover and the stanchion.

16. The traction battery pack as recited in claim 12, wherein the cover attachment includes a first magnet mounted to the enclosure cover and a second magnet mounted to the stanchion.

17. The traction battery pack as recited in claim 12, wherein the cover attachment includes a first touch fastener mounted to the enclosure cover and a second touch fastener mounted to the stanchion.

18. The traction battery pack as recited in claim 12, wherein the cover attachment includes a ball-and-socket assembly.

19. The traction battery pack as recited in claim 12, wherein the cell row separator includes a base, the first projection that extends from the base, and the second projection that extends from the base; and further wherein the structural adhesive is received within a gap extending between the first projection and the second projection.

* * * * *